United States Patent
Amron

(10) Patent No.: US 7,664,255 B2
(45) Date of Patent: Feb. 16, 2010

(54) HANDS FREE AURAL DEVICE HOLDER

(75) Inventor: Alan Amron, Brooklyn, NY (US)

(73) Assignee: Thought Development Inc., Woodbury, NY (US)

( * ) Notice: Subject to any disclaimer, the term of this patent is extended or adjusted under 35 U.S.C. 154(b) by 497 days.

(21) Appl. No.: 11/786,819

(22) Filed: Apr. 13, 2007

(65) Prior Publication Data

US 2008/0240418 A1 Oct. 2, 2008

Related U.S. Application Data

(63) Continuation-in-part of application No. 11/731,492, filed on Mar. 30, 2007, now Pat. No. 7,613,294.

(51) Int. Cl.
*H04M 1/00* (2006.01)
*H04M 9/00* (2006.01)
(52) U.S. Cl. .................. 379/420.04; 379/449; 379/455; 379/430; 455/575.6
(58) Field of Classification Search ............ 379/420.04, 379/428, 430, 446, 447, 449, 454, 455; 455/569.1, 455/90.3, 575.1, 575.6
See application file for complete search history.

(56) References Cited

U.S. PATENT DOCUMENTS

| 5,706,345 A | * | 1/1998 | Allen | 379/430 |
| 5,828,749 A | * | 10/1998 | Brodskiy | 379/430 |
| 6,363,147 B1 | * | 3/2002 | Maxwell | 379/430 |

* cited by examiner

*Primary Examiner*—Tuan D Nguyen
(74) *Attorney, Agent, or Firm*—Cohen Pontani Lieberman & Pavane LLP

(57) ABSTRACT

Disclosed is a hands-free holder for hands-free use of a device that is designed to be held up to a user's ear. The holder is connectable to the device and includes a sleeve that includes a transparent elastically stretchable material that defines an opening for receiving a portion of the device. The holder further includes a curved member that includes a first end and second end rotatably coupled to a first side of the sleeve and to an opposite side of the sleeve, respectively. The curved member defines an opening for receiving the top of a user's ear and is configured to rest on and behind the user's ear when the top of the user's ear is received in the opening such that the device connected to the holder is supported by the user's ear, thereby allowing hands-free use of the device.

23 Claims, 20 Drawing Sheets

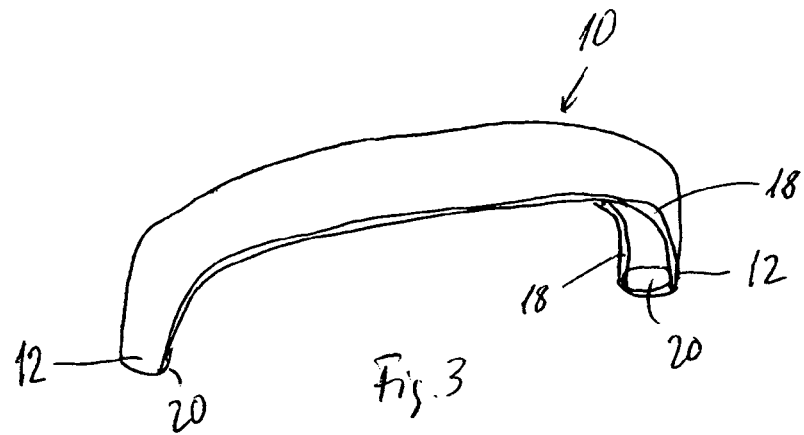
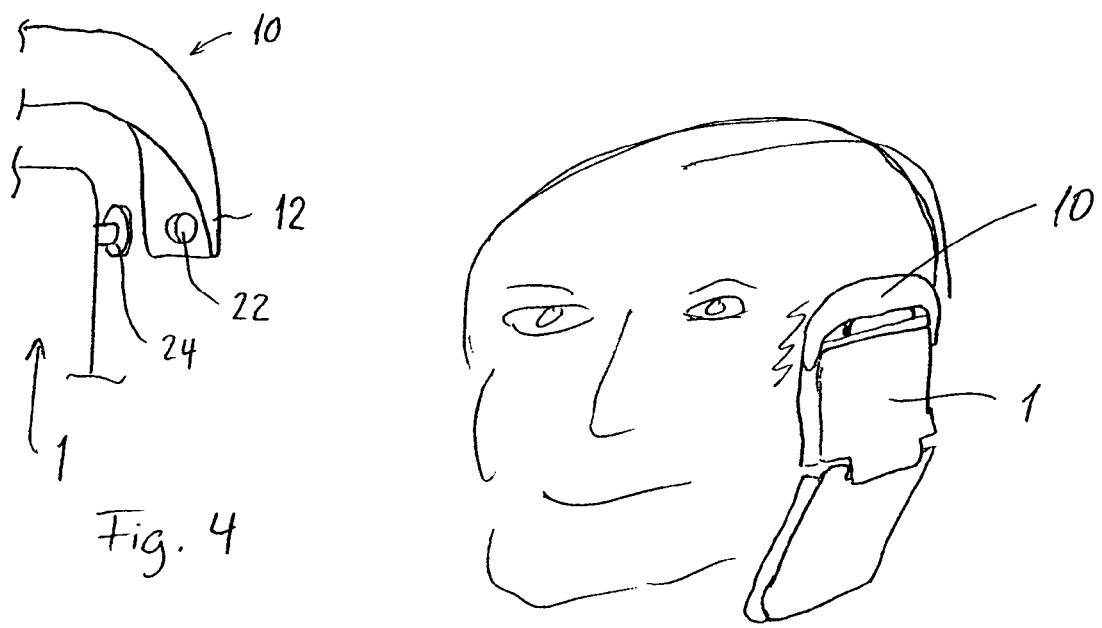
Fig. 3
Fig. 4
Fig. 5

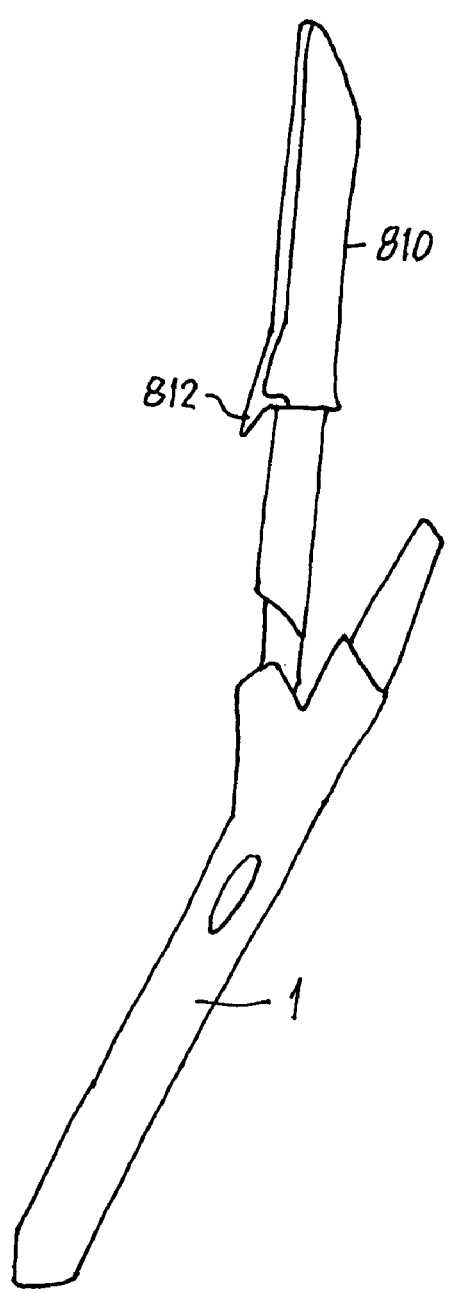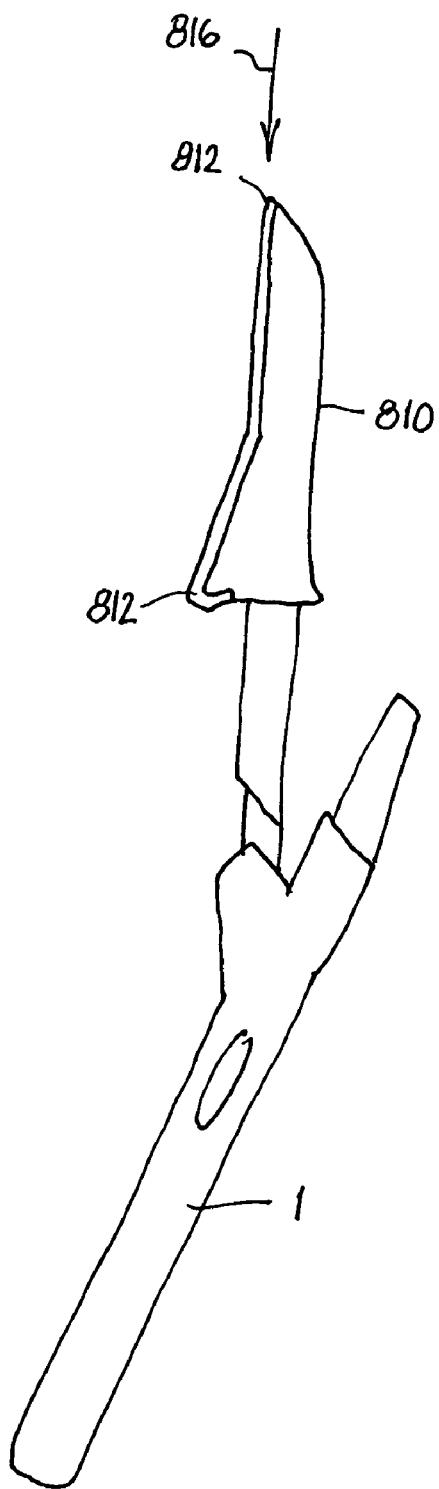
Fig. 29A
Fig. 29B

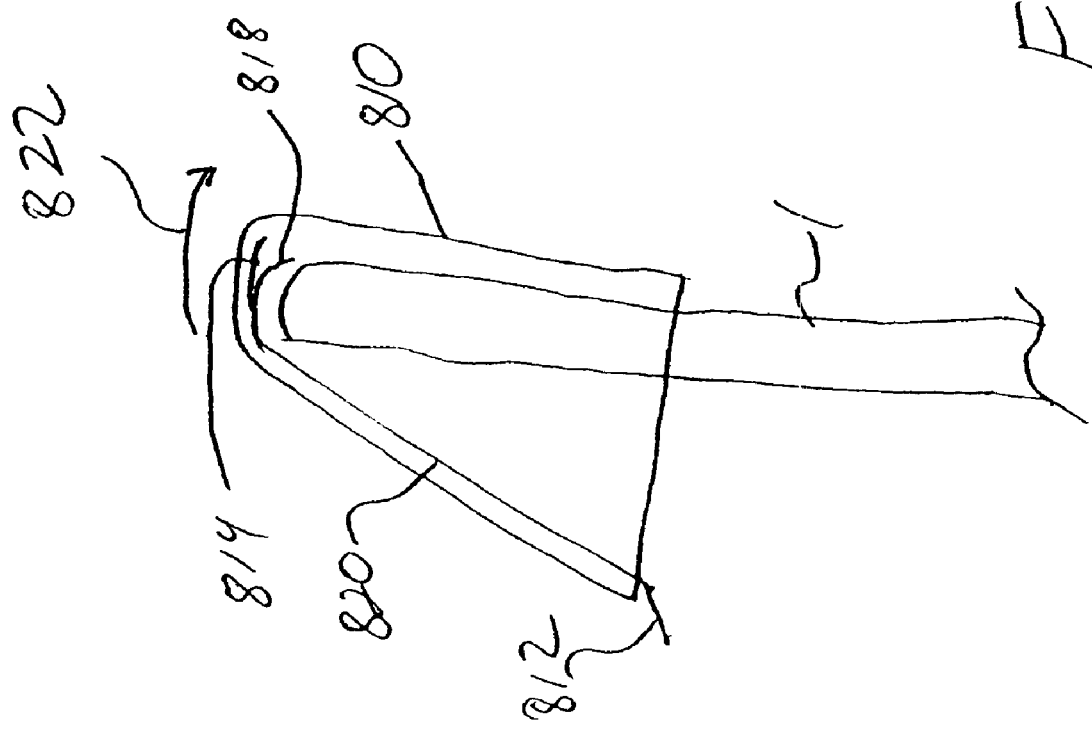

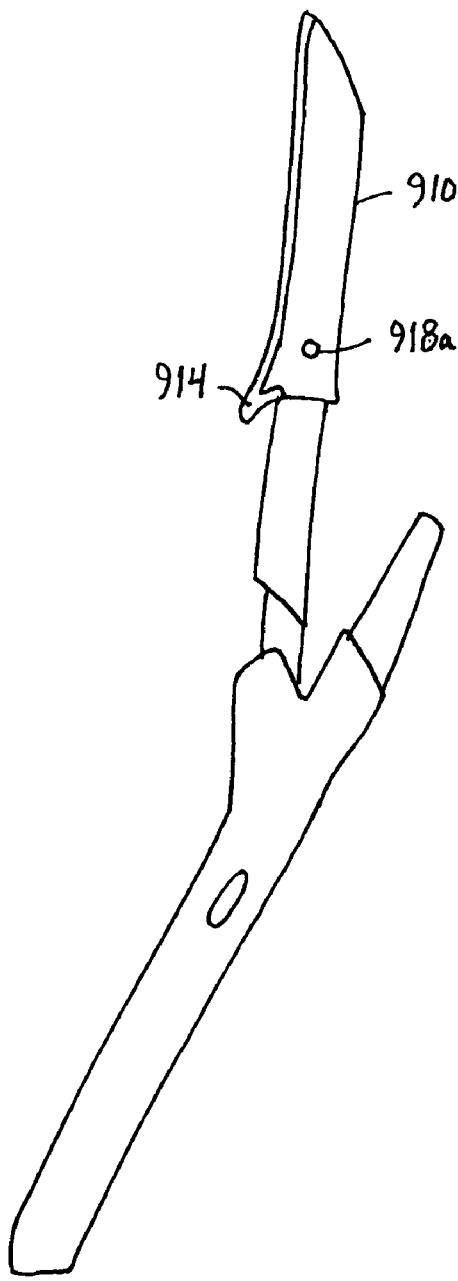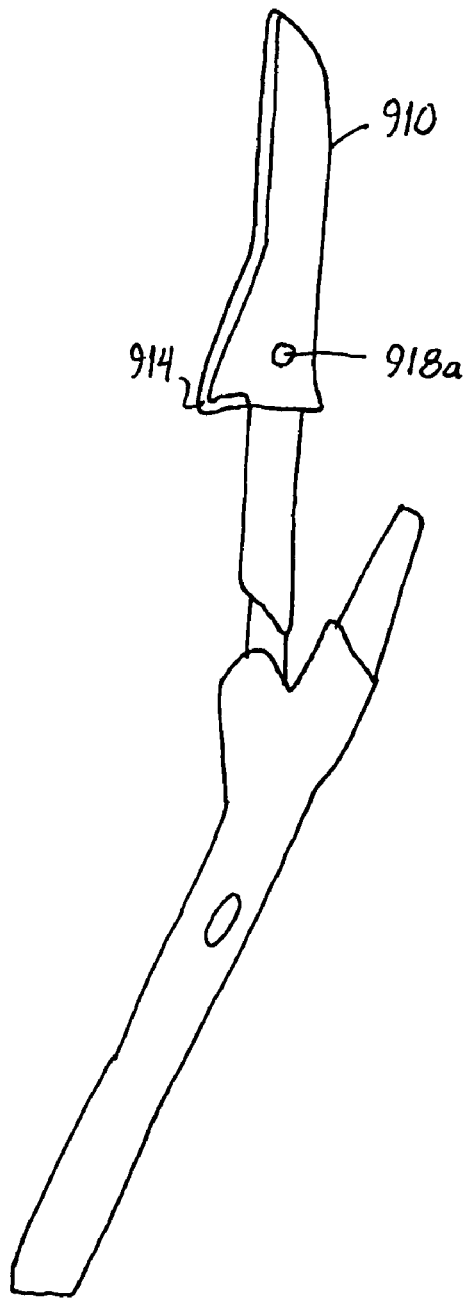
Fig. 30A
Fig. 30B

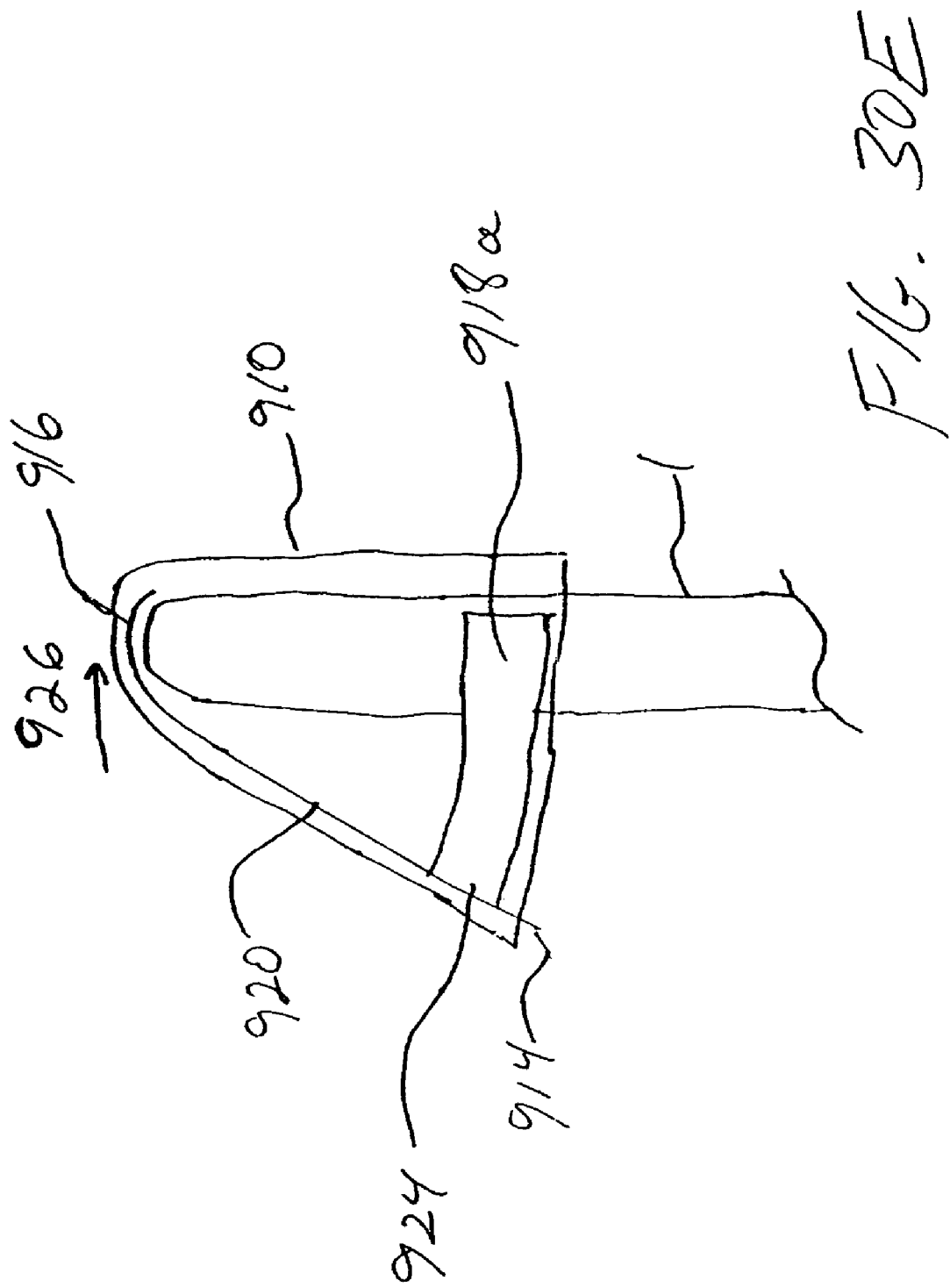

HANDS FREE AURAL DEVICE HOLDER

CROSS-REFERENCE TO RELATED APPLICATIONS

This is a continuation-in-part of application Ser. No. 11/731,492, filed Mar. 30, 2007, the content of all of which is hereby incorporated by reference.

BACKGROUND OF THE INVENTION

1. Field of the Invention

The present invention relates to a holder for hands-free holding any device, and particularly a cell phone handset, to a user's ear.

2. Description of the Related Art

Cell phones are typically held by a user's hand and are therefore difficult to use when a user is also carrying packages, opening a door, or writing notes during the phone call. To overcome these obstacles and allow hands-free conversations, Bluetooth headsets are available. The Bluetooth headsets are worn on a user's ear and communicate with the user's cell phone using wireless Bluetooth communications. However, this solution requires an additional piece of equipment which the user must carry in order to conduct hands-free conversations.

Other known solutions for allowing hand-free conversations with cell phones include cell phone holders which hold the cell phones themselves on the user's head. An example of known cell phone holder is described in U.S. Pat. No. 7,120,247. This holder includes a headband with an attachment for holding a cell phone. However, this solution requires that the user always wear the headband or always carry the headband if the user wants to be able to conduct a hands-free conversation when required.

Another hands-free cell phone holder device is disclosed in U.S. Pat. No. 6,374,090. This device is an attachment to a cell phone which includes a clamp which grips the sides of the cell phone and a hook which is received around the back of a user's ear. This solution also requires an additional device that must be carried in addition to the phone. Furthermore, even if this device is kept in the attached state on the cell phone, it is adds bulk to the cell phone which makes it more difficult to hold the cell phone on the person when not in use.

SUMMARY OF THE INVENTION

According to one aspect, the invention involves a hands-free holder for hands-free use of a device that is designed to be held up to a user's ear. The holder is connectable to the device and includes a sleeve comprising a transparent elastically stretchable material defining a cavity with an opening for receiving a top portion of the device into the cavity, and a curved member that includes a first end and second end. The first end is rotatably coupled to a first side of the sleeve and the second end is rotatably coupled to an opposite side of the sleeve. The curved member defines an opening for receiving the top of a user's ear and is configured to rest on and behind the user's ear when the top of the user's ear is received in the opening such that the device connected to the holder is supported by the user's ear, thereby allowing hands-free use of the device.

In one embodiment, the sleeve defines a second opening that allows the top portion of the device to extend out of the cavity such that the sleeve is wrapped around the top portion of the device. In another embodiment, the sleeve defines a plurality of holes disposed on a front face of the sleeve. The holes are positioned over a front face of the top portion of the device when the top portion of the device is disposed in the cavity. In another embodiment, the device is one of a telephone, cell phone, or PDA. In other embodiments, the holder is held onto the device by a friction fit when the top portion of the device is received into the cavity. In yet another embodiment, the holder further includes an adhesive disposed on a wall of the cavity for connecting the holder to the device.

According to another aspect, the invention involves a hands-free holder for hands-free use of a device that is designed to be held up to a user's ear. The holder is connectable to the device and includes a sleeve that includes an elastically stretchable material that defines a cavity with an opening for receiving a top portion of the device and the top of a user's ear into the cavity. The holder further includes a rigid member that includes a frame portion and lever portion disposed inside the cavity. The lever portion, when pressed moves the frame portion to stretch the sleeve away from the top portion of the device when the top portion of the device is disposed in the cavity thereby widening the opening to allow the top of the user's ear to be received into the cavity such that the holder and the device is supported and retained on the user's ear when the holder is connected to the device, thereby allowing hands-free use of the device connectable to the holder.

In one embodiment, the rigid member further includes a projection extending out of the opening and projecting away from the device when the top portion of the device is disposed in the cavity to facilitate placement of the top of the user's ear into the sleeve. In another embodiment. In another embodiment, the sleeve defines a plurality of holes disposed on a front face of the sleeve. The holes are positioned over a front face of the top portion of the device when the top portion of the device is disposed in the cavity. In still another embodiment, the elastically stretchable conforms to the contours of a user's ear when the top of the user's ear is inserted into the cavity. In yet another embodiment, the device is one of a telephone, cell phone, or PDA. In other embodiments, at least a portion of the front face of the sleeve is thinner than the remainder of the sleeve. In another embodiment, the holder is held onto the device by a friction fit when the top portion of the device is received into the cavity. In yet another embodiment, the holder further includes an adhesive disposed on a wall of the cavity for connecting the holder to the device.

According to still another aspect, the invention involves a handset device designed to be held proximate a user's ear during use thereof having a device body and a holder arranged on the device body. The holder includes a curved member that includes a first end and second end. The first end is rotatably coupled to a first side of a top portion of the handset device and the second end is rotatably coupled to an opposite side of the top portion of the handset device. The curved member defines an opening for receiving the top of a user's ear and is configured to rest on and behind the user's ear when the top of the user's ear is received in the opening such that the device connected to the holder is supported by the user's ear, thereby allowing hands-free use of the device. In one embodiment, the handset device is one of a telephone, cell phone, or PDA.

According to still another aspect, the invention involves a hands-free holder for hands-free use of a device that is designed to be held up to a user's ear. The holder is connectable to the device and includes a clip member comprising a rear wall and two opposing side walls adjacent to the rear wall. The two opposing side walls are configured to grip two respective opposing sides of an upper portion of the device such that the rear wall contacts a rear face of the upper portion of the device and the upper portion of the device is held by the clip member. The holder further includes a curved member comprising a first end and second end. The first end is rotatably coupled to one of the two opposing side walls. The second end is rotatably coupled to the other of the two opposing side walls. The curved member defines an opening for receiving the top of a user's ear and is configured to rest on and behind the user's ear when the top of the user's ear is received in the opening such that the device and the connected holder are supported by the user's ear, thereby allowing hands-free use of the device.

In one embodiment, the device is one of a telephone, cell phone, or PDA. In another embodiment, the holder is held onto the device by a friction fit. In yet another embodiment, the clip member includes a flexible material that is sufficiently rigid to retain its shape when the device and the holder are supported on the user's ear. In still another embodiment, the opposing side walls include tabs. The tabs are inserted into a groove or slot in the device when the clip member is connected to the upper portion of the device.

BRIEF DESCRIPTION OF THE DRAWINGS

In the drawings, wherein like reference characters denote similar elements throughout the several views:

FIG. 3 is a perspective view of the aural device holder of FIG. 1;

FIG. 4 is detailed perspective view of a connection of the holder to the aural device;

FIG. 5 is a perspective view of the aural device holder of FIG. 1 being used;

FIG. 29A is an illustrative side view of an aural device including an aural device sleeve in a closed position, according to one embodiment of the invention;

FIG. 29B is an illustrative side view of the aural device of FIG. 29A including an aural device sleeve in an open position;

FIG. 29E is an illustrative side view the aural device of FIG. 29C in an open position;

FIG. 30A is an illustrative side view of an aural device including an aural device sleeve in a closed position, according to one embodiment of the invention;

FIG. 30B is an illustrative side view of an aural device including an aural device sleeve in an open position, according to one embodiment of the invention;

FIG. 30E is an illustrative side view the aural device of FIG. 30C in an open position.

DETAILED DESCRIPTION OF THE PREFERRED EMBODIMENTS

Figure 1:
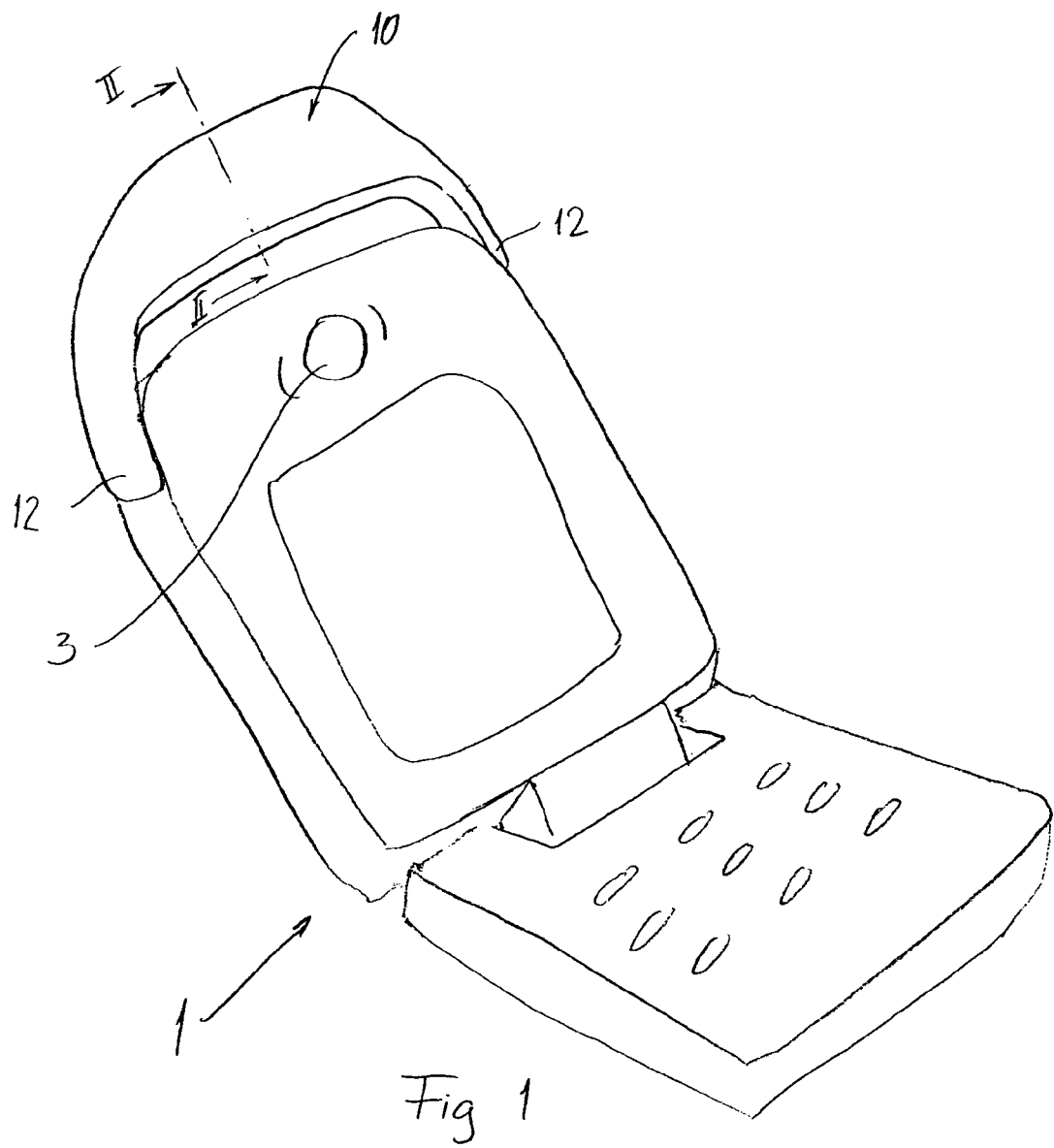
FIG. 1 is a perspective view of a hands-free aural device holder arranged on an aural device according to an embodiment of the present invention.
Figure 2:
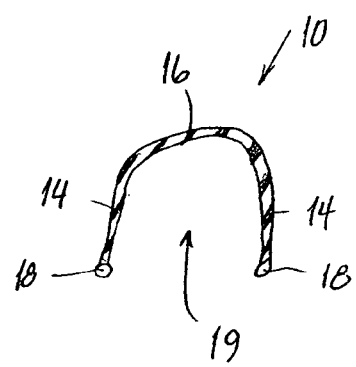
FIG. 2 is a sectional view of the aural device holder of FIG. 1.

A hands-free cell phone handset holder 10 for hanging a phone handset 1 on a user's ear is shown in FIGS. 1-3. Although the holder 10 is shown as arranged on a cell phone handset, the holder according to the present invention may be used for any device intended to be held up to a user's ear such as, for example, all types of phone handsets, ear phones, PDAs such as BLACKBERRY™ and PALM™ devices, and ear muffs. The holder 10 is attached to the device to be held to the user's ear and defines a pocket 19 for receiving a top end of a user's ear.

In the embodiment shown in FIGS. 1-3, holder 10 is arranged proximate a speaker or ear piece 3 on the handset 1, i.e., proximate a portion of the handset 1 that is normally held to the user's ear during use. The holder 10 is in the form of a strap having two opposing ends 12 that are connected on opposing sides of the handset 1. The holder 10 may be made from an elastic or inelastic cloth, or an elastic rubber material. An adhesive 20 is used to attach the ends 12 of the strap to the handset 1. However, any known or hereafter developed methods of attachment may be used. For example, FIG. 4 shows an embodiment in which an aperture 22 at the end of the strap engages a boss 24 on the cell phone 1.

Regardless of how the holder 10 is attached, the holder 10 of the embodiment of FIGS. 1-3 has a contour which forms a pocket 19 for receiving the top of the user's ear. For this purpose, the holder has side sections 14 and a top section 16 which define the pocket 19, the side sections 14 and top section 16 extending between the two ends 12 of the holder 10. For stability, the holder includes a reinforcing strand 18 arranged at the free edge of the side sections 14 and extending between the two ends 12. The reinforcing strand 18 may be formed by a thread or a string of fiber running through or stitched through the side sections 14. Alternatively, the reinforcing strand may simply comprise a thick portion of the material of the side sections, i.e., a bead of material. FIG. 5 shows the holder 10 in use holding a handset 1 onto a user's ear.

Figure 6:
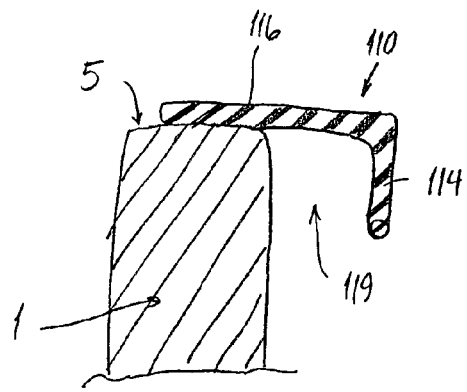
FIG. 6 is a sectional view of an aural device holder according to another embodiment of the invention.
Figure 7:
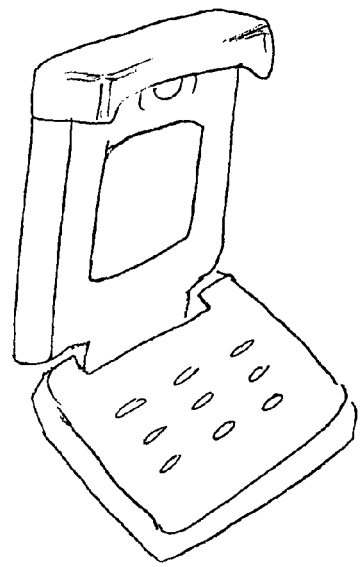
FIG. 7 is a perspective view of the aural device holder of FIG. 6 arranged on a cell phone.

Instead of being formed as a strap, the holder 110 may be formed as an elastic piece having a top section 116 and a side section 114 as shown in FIGS. 6-7. In this embodiment, one part of the top section 116 is attached to a top 5 of the handset 1 using an adhesive. Another part of the top section 116 projects over the front of the handset 1. The side section projects downward from the top so that a space or pocket 119 is defined between the side 114 and the handset 1. Since the material is elastic, the side 114 deforms when the handset is closed. Accordingly, if the handset is a flip phone, it is allowed to completely close.

Figure 8:
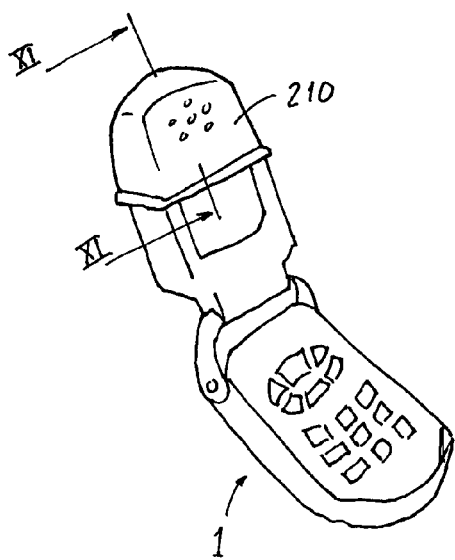
FIG. 8 is a perspective view of an aural device holder according to another embodiment arranged on a cell phone.
Figure 9:
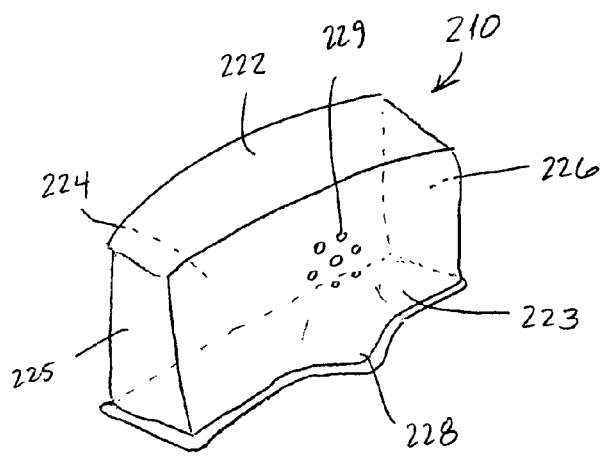
FIG. 9 is a perspective view of the aural device holder of FIG. 8.

In another embodiment shown in FIGS. 8-9, a holder 210 comprises a top section 222, a front section 223, a rear section 224, two side sections 225, 226, and an open bottom. The holder 210 is preferably made from an elastic rubber material. The holder 210 is stretched over the top of the handset 1 and creates a friction fit with the handset 1. Alternatively, or additionally, an adhesive may be used to hold the hands-free holder 210 onto the handset 1. In the embodiment shown in FIGS. 8 and 9, the front section 223 of the holder 210 is loosely held against the handset 1. This configuration allows the handset 1 to close properly if it is a flip phone. It also allows the handset 1 to be used normally, i.e., without having the holder placed on the user's ear, with minimum interference. Holes 229 are provided on the front section 223 so that sound from the speaker is not muffled by the front section 223. At least a portion of the front section 223 of holder 210 may comprise a thinner material than the remainder of the holder to facilitate stretching over a user's ear.

Holder 210 in FIGS. 8-9 is depicted as being substantially rectilinear in that there are corners between each of the front 223, sides 225, 226, rear 224, and top 222. However, the holder may also be formed in an oblong oval shape so that the front 223, sides 225, 226, rear 224, and top 222 are defined as general locations without corners therebetween.

Figure 10:
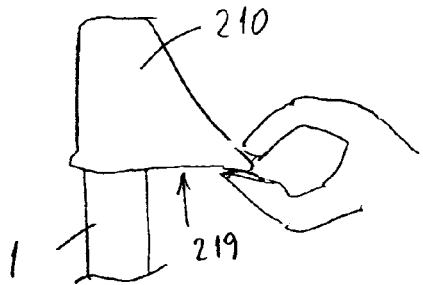
FIG. 10 is a side view of the aural device holder of FIG. 8 being stretched by a user.

The phone handset holder 210 includes a projection 228 on the front 223 as shown in FIG. 9 which facilitates manually pulling the projection 228 away from the phone to create a pocket 219 for receiving the top of a user's ear (see FIG. 10). Alternatively, the projection 228 creates a space which is placed over the user's ear and further movement of the cell phone and holder onto the ear forces the front 223 of the holder 210 to expand around the user's ear, making it easier to place the top of the user's ear into the pocket 219.

Figure 11:
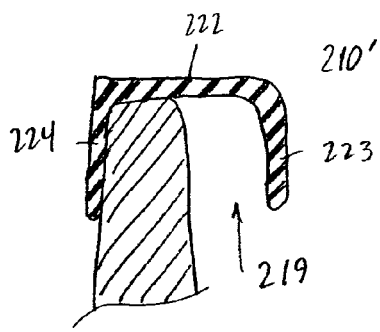
FIG. 11 is a sectional view of the aural device holder of FIG. 8.
Figure 13:
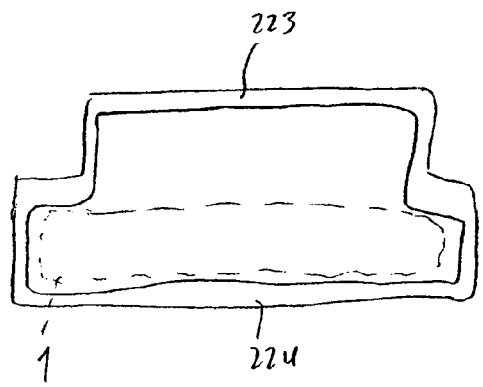
FIG. 13 is a bottom view of an embodiment of an aural device holder according to FIG. 8.
Figure 12:
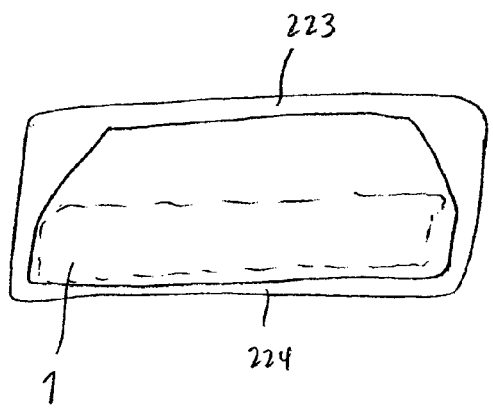
FIG. 12 is a bottom view of an embodiment of an aural device holder according to FIG. 8.
Figure 14:
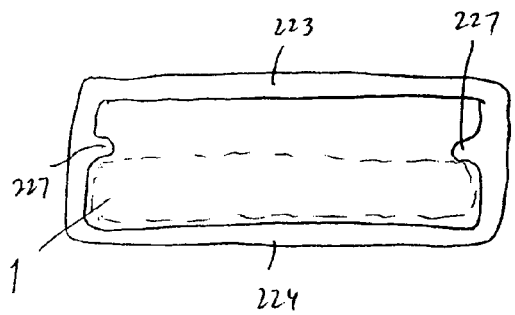
FIG. 14 is a bottom view of another embodiment of an aural device according to FIG. 8.

In the embodiment shown in FIG. 11, a holder 210' which is similar to the holder 210 described above, defines a pocket 219 for receiving the top of the user's ear between the front 223 of a holder 210 and the cell phone 1 when installed. The interior of the sides 225, 226 is configured to ensure that the rear 224 is held against the back of the cell phone so that the pocket is formed at the front 223 of the holder 210'. To accomplish this, the sides 225, 226 may be tapered or inclined as shown in FIG. 12 or stepped as shown in FIG. 12. In both the embodiments of FIGS. 12 and 13, the top of the cell phone 1 is inserted into the widest portion of the hands-free holder 210 so that the pocket 219 is created at the desired side of the cell phone 1. According to yet another embodiment shown in FIG. 14, the holder 210' has ribs 227 running up the sides 225, 226. The ribs 227 are located off-center such that they are located closer to the front 223. In this case, the cell phone may be inserted between the rear and the ribs 227 or between the front 223 and the ribs 227, depending on the thickness of the cell phone, to form the pocket 219 at the front 223 or the rear, respectively.

Figure 15:
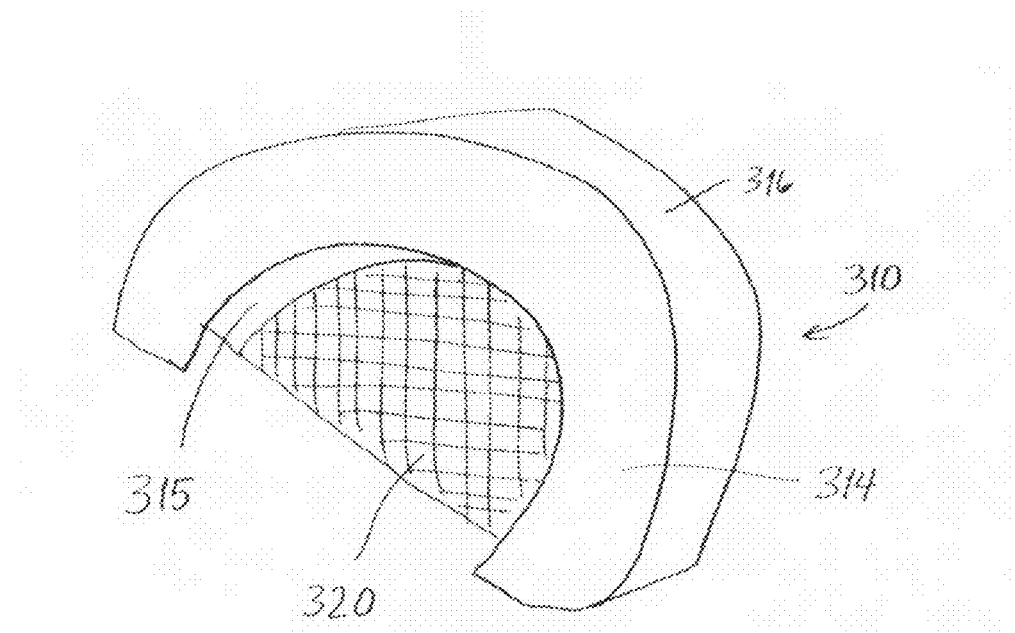
FIG. 15 is a perspective view of another embodiment of an aural device holder according to the present invention.
Figure 16:
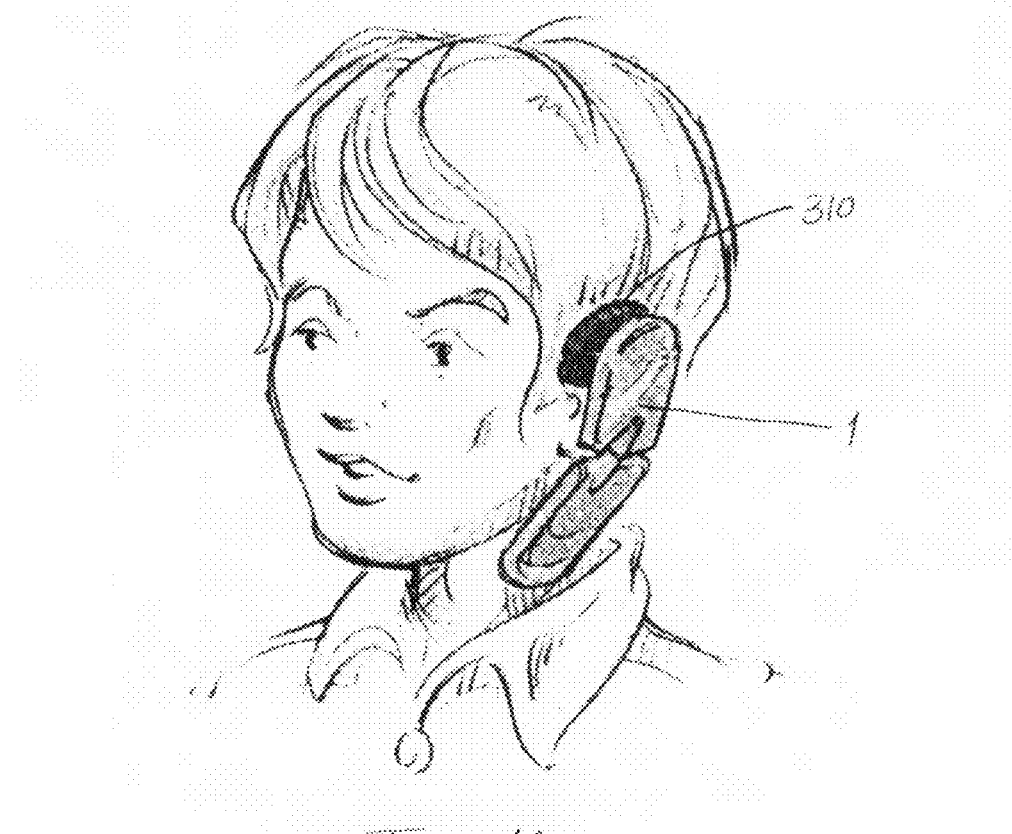
FIG. 16 is a perspective view of the embodiment of FIG. 15 in use.

In yet a further embodiment shown in FIGS. 15-16, a holder 310 approximates a semicircular shape having a circumferential outer wall 316 and two sidewalls 314, 315. The rear sidewall 315 is attached to the phone using an adhesive. Furthermore, a mesh or other material 320 which does not interfere with the sound projecting from the speaker is attached to the rear side wall 315. FIG. 16 shows the holder 310 being used to hold a phone on a user's ear.

Figure 17:
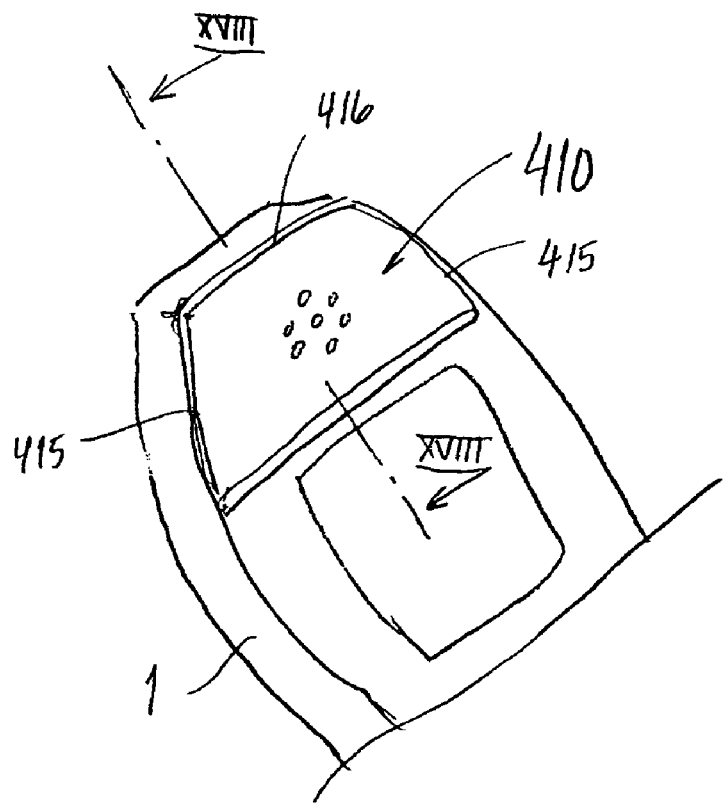
FIG. 17 is a perspective view of another embodiment of an aural device holder according to the present invention.
Figure 18:
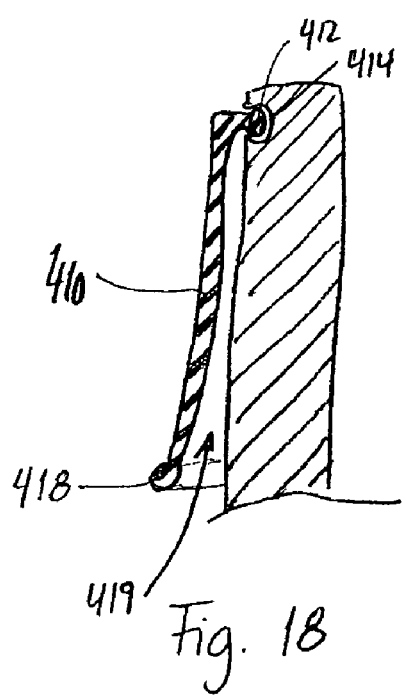
FIG. 18 is a sectional view of the aural device holder of FIG. 17.

In each of the above embodiments, the holder, 10, 110, 210, and 310 is retrofitted to a handset. However, the holder may also be incorporated into the OEM design of the device. FIGS. 17-18 show an example of a holder 410 being incorporated into an OEM design of a phone handset. According to this embodiment, the holder is an elastic material having a top edge 416 and side edges 415 that are held onto the face of the handset 1. The edges 415 and 416 may have a bead 412 running along and edge thereof which is inserted into a channel 414 in the face of the handset 1 to releasably connect the holder to the handset. The releasable connection allows the holder 410 to be removed for cleaning and/or replacement. Alternatively, the holder 410 may be permanently connected using an adhesive at the edges 415, 416. The lower edge of the holder 410 is not connected to the face of the handset 1 and includes a bead 418 for strength and stability. As shown in FIG. 18, a pocket 419 is defined between the holder 410 and the handset. Instead of holder 410, any of the embodiments of holder 10, 110, 210, and 310 described above may be incorporated into a handset or other device as an OEM design.

Figure 19:
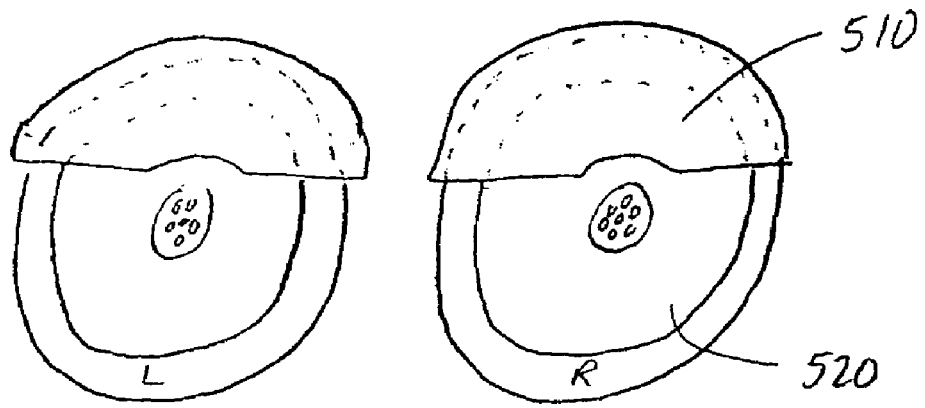
FIG. 19 is a schematic view of an aural device holder arranged on headphone speakers.
Figure 20:
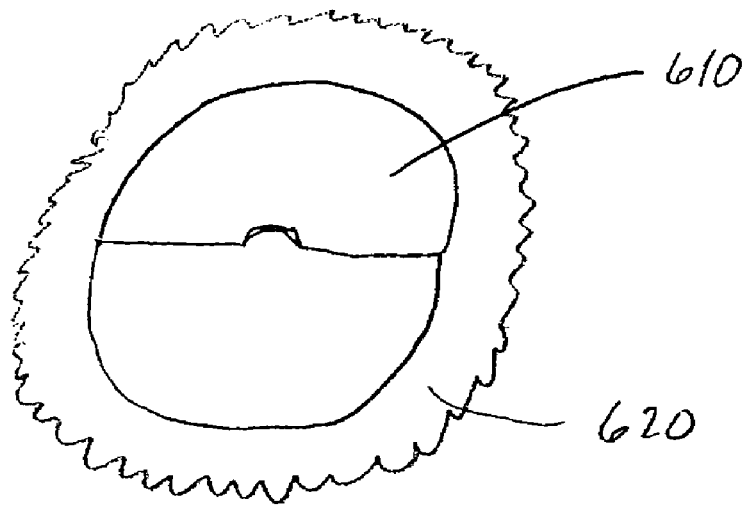
FIG. 20 is a schematic view of an embodiment of an aural device holder arranged on ear muffs.

As mentioned above, the holder 10, 110, 210, 310, and 410 described above may be used with various different devices which are held to a user's ear during use. FIG. 19 shows a holder 510 which is similar to the holder 410 arranged on ear phones, or headphones 520. The holder 520 eliminates the need for a support between the two speakers which arches over a user's head. FIG. 20 shows a further use in which holder 610, also similar to holder 410, is arranged on each side of ear muffs 620. Although the holders 510 and 610 are described and shown as being similar to holder 410, the holders 510, and 610 may also be designed similar to any others of the above-described embodiments of holders 10, 110, 210, and 310.

Figure 21:
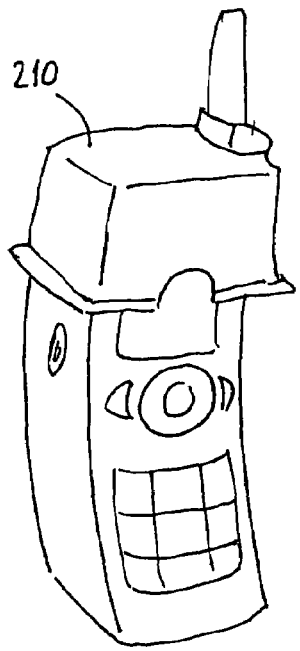
FIGS. 21-23 are schematic views of the device holder of FIG. 8 arranged on a wireless home phone, PDA, and traditional phone handset, respectively.
Figure 22:
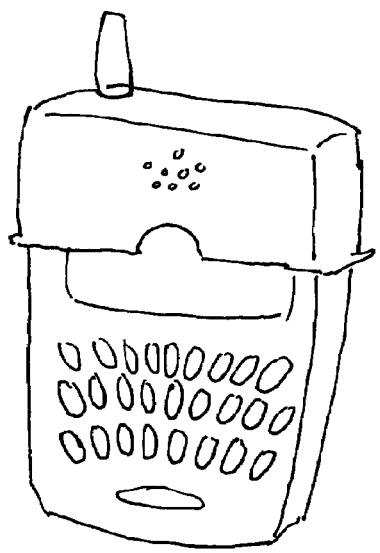
Figure 23:
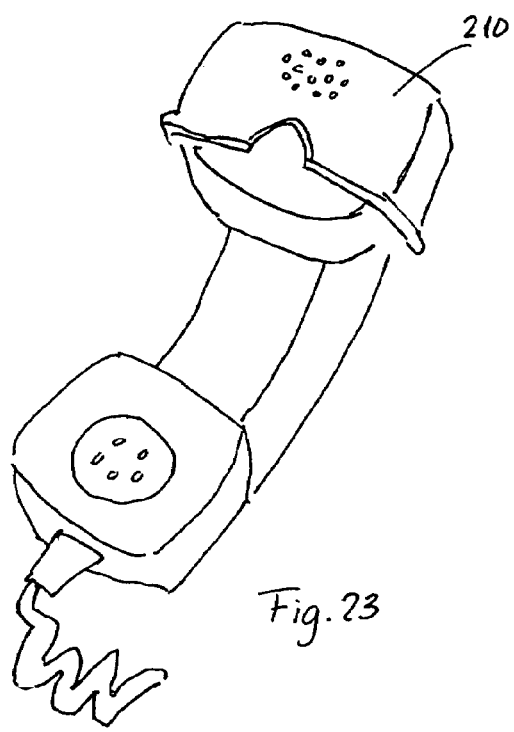

FIGS. 21-23 are schematic views of the device holder 210 of FIG. 8 arranged on a wireless home phone, PDA, and traditional phone handset, respectively.

Figure 24A:
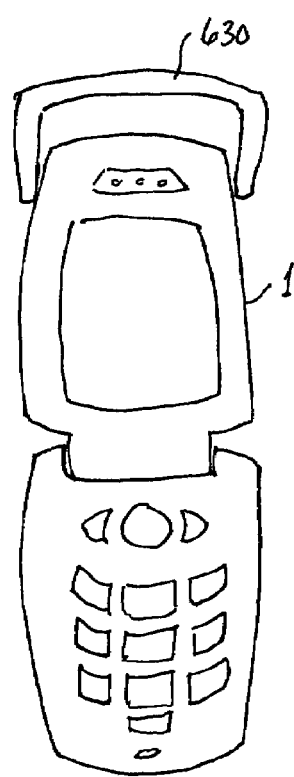
FIGS. 24A-24B are illustrative front and side views of an aural device including an aural device holder moveably coupled to the aural device, according to one embodiment of the invention.
Figure 24B:
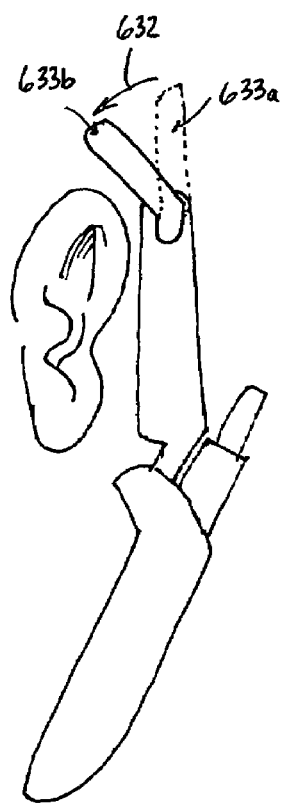
Figure 24C:
FIG. 24C is an illustrative perspective view a user wearing the aural device utilizing the aural device holder of FIG. 24A.

Referring to FIGS. 24A-24B, in one embodiment, illustrative front and side views of an aural device (e.g., a cell phone 1) including an aural device holder 630 moveably coupled to the cell phone 1 are shown. In this embodiment, the device holder 630 is directly coupled to the cell phone 1. The device holder 630 when not in use is moved to a first position 633a. When a user wishes to use the device holder 630 to hang the cell phone 1 from his/her ear, the user moves the device holder 630 to a second position 633b, as indicated by arrow 632. A user wearing the cell phone 1 utilizing the device holder 630 is shown in FIG. 24C. It can be seen the once the device holder 630 is moved to the second position 633b, the user need only hang the cell phone 1 from his/her ear.

Figure 25A:
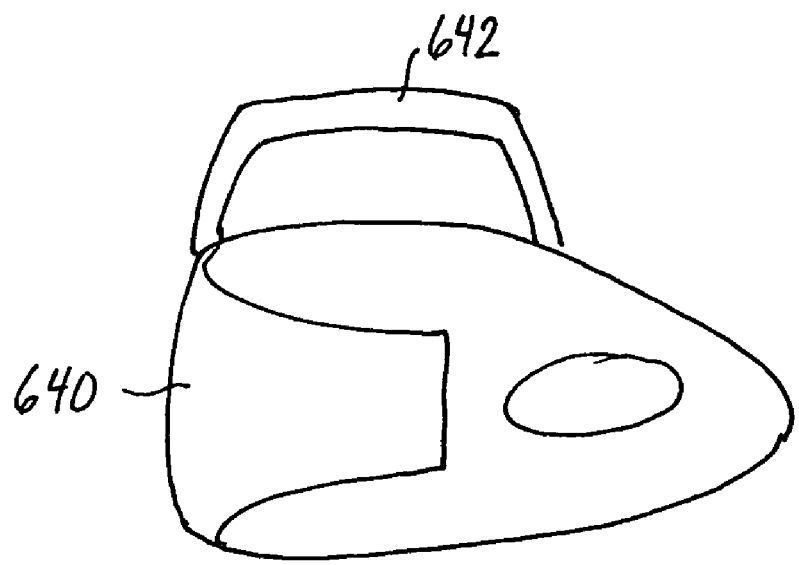
FIGS. 25A and 25B are illustrative side views of an aural device holder affixed moveably to a Bluetooth aural device, according to one embodiment of the invention.
Figure 25B:
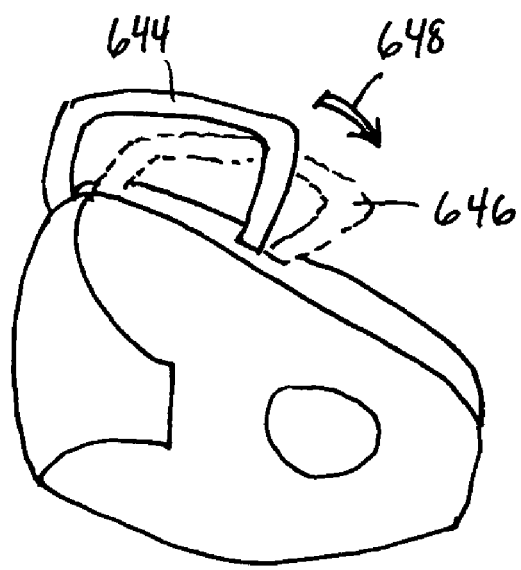

Referring to FIGS. 25A-25B, in another embodiment, illustrative side views of an aural device holder 642 affixed moveably to a Bluetooth aural device 640 is shown. Similar to the previous embodiment, the device holder 642 is directly coupled to the Bluetooth device 640. The device holder 642 when not in use is moved to a first position 644. When a user wishes to use the device holder 642 to hang the Bluetooth device 640 from his/her ear, the user moves the device holder 642 to a second position 646, as indicated by arrow 648. Once the device holder 642 is moved to the second position 646, the user need only hang the Bluetooth device 640 from his/her ear.

Figure 26A:
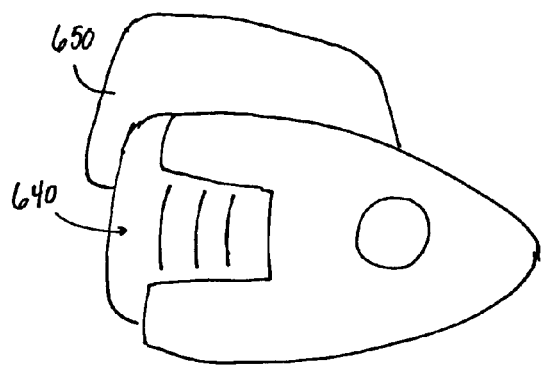
FIG. 26A is an illustrative side view of an aural device sleeve coupled to a Bluetooth aural device, according to one embodiment of the invention.
Figure 26B:
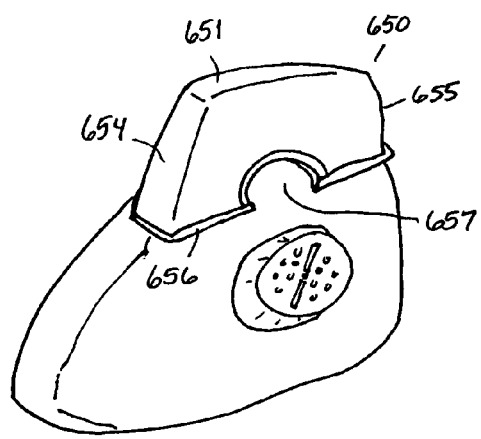
FIG. 26B is an illustrative perspective view of the aural device sleeve coupled to the Bluetooth aural device of FIG. 26A.
Figure 26C:
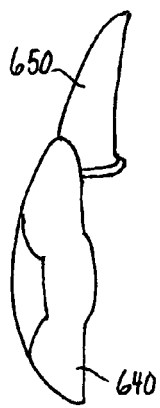
FIG. 26C is an illustrative front view of the aural device sleeve coupled to the Bluetooth aural device of FIG. 26A.

Referring to FIGS. 26A-26C, in one embodiment, side, perspective, and front views of an aural device sleeve 650 coupled to an aural device comprising a Bluetooth headset 640 are shown, respectively. In this embodiment, the sleeve 650 includes a top section 651, a front section 652, a rear section 653, two side sections 654, 655, and an open bottom 656. The sleeve 650 is preferably made from an elastic or rubber material. The sleeve 650 is stretched over the top of the Bluetooth device 640 and creates a friction fit with the Bluetooth headset 640. Alternatively, or additionally, an adhesive may be used to hold the hands-free sleeve 650 onto the Bluetooth device 650. A groove or notch 657 is provided on the front section 652, which is used to encircle the top portion of a wearer's ear. At least a portion of the front section 652 of sleeve 650 may include a thinner material than the remainder of the holder to facilitate stretching over a user's ear.

Figure 26D:
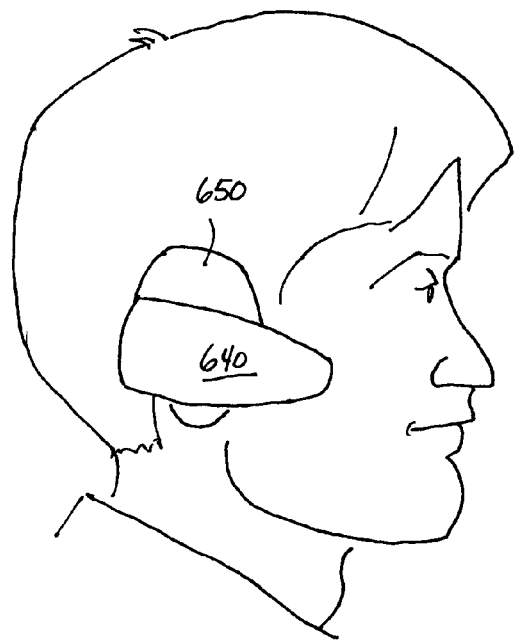
FIG. 26D is an illustrative view of a user wearing the Bluetooth aural device including the aural device sleeve of FIG. 26A.

In operation, the front section 652 of the sleeve 650 is pulled away from the Bluetooth headset 640 and pulled over the wearer's ear as the Bluetooth ear piece 658 is inserted into the wearer's ear, as shown in FIG. 26D.

Figure 27:
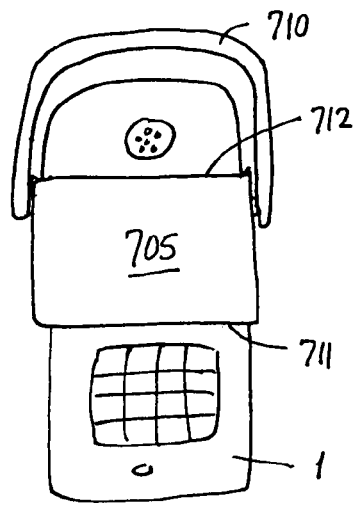
FIG. 27 is an illustrative front view of an aural device including an aural device holder, according to one embodiment of the invention.

Referring to FIG. 27, in another embodiment, an illustrative front view of an aural device (e.g., a cell phone 1) including an aural device holder 710 is shown. In this embodiment, the device holder 710 is attached to the cell phone 1 via transparent member 705. The transparent member 705 is preferably made from a transparent elastic rubber material. The cell phone 1 is slid into a first open end 711 of the transparent member 705 and pushed through the transparent member 705 so that a portion of the cell phone 1 extends out of a second open end 712 of the transparent member. Once the cell phone 1 is inserted into the transparent member 705, the transparent member 705 creates a friction fit with the cell phone 1. Alternatively, or additionally, an adhesive may be used to hold the member 705 onto the cell phone handset 1. In one embodiment, the transparent member 705 includes holes (not shown) in the section covering the ear speaker so that sound from the speaker is not muffled by the member 705, similar to the embodiment shown in FIG. 9. The embodiment shown in FIG. 27 allows the cell phone handset 1 to be used normally (i.e., without having the holder placed on the user's ear), with minimum interference.

In operation, the device holder 710 functions similar to the device holder 630 of FIGS. 24A and 24B. The device holder 710 when not in use is moved to a first position, as shown in FIG. 27. When a user wishes to use the device holder 710 to hang the cell phone 1 from his/her ear, the user moves the device holder 710 to a second position (similar to position 633b of FIG. 24B). Once the device holder 710 is moved to the second position, the user need only hang the cell phone 1 from his/her ear.

Figure 28A:
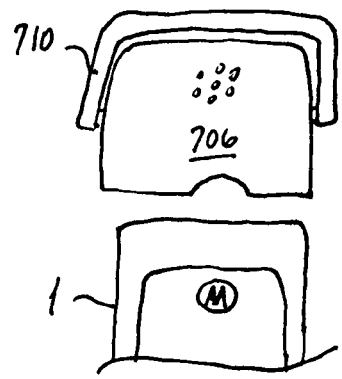
FIGS. 28A-28C are illustrative front views and a perspective view of an aural device including an aural device holder, according to one embodiment of the invention.
Figure 28B:
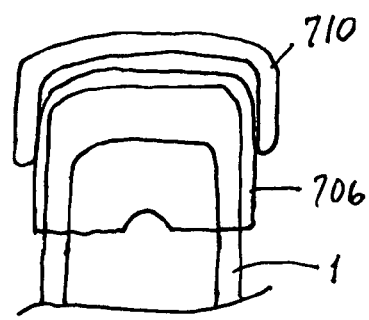
Figure 28C:
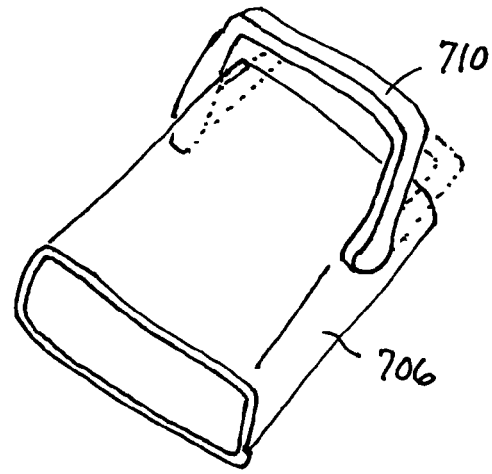
Figure 29D:
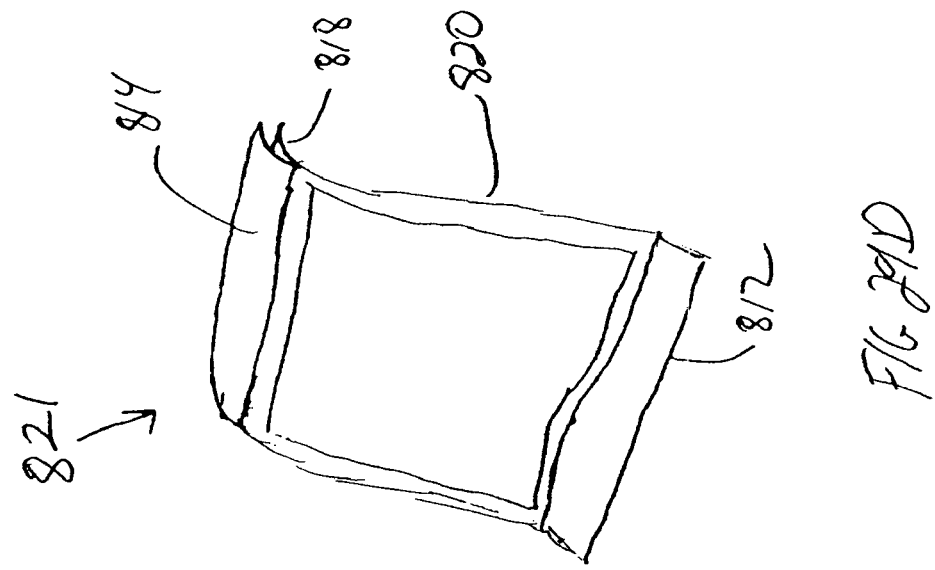
FIG. 29D is an illustrative perspective view of a rigid member, according to one embodiment of the invention.
Figure 29C:
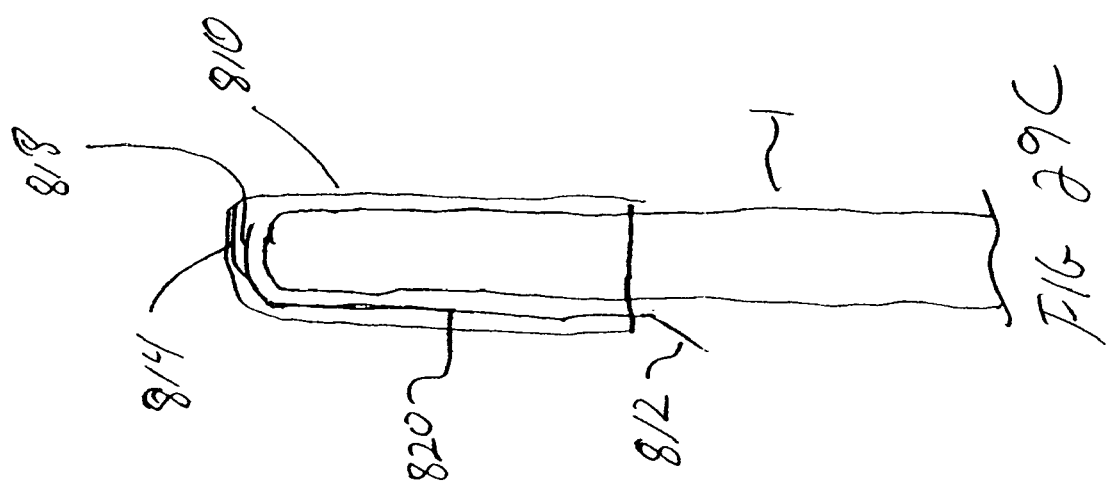
FIG. 29C is an illustrative side view of an aural device including an aural device sleeve and a rigid member in a closed position, according to one embodiment of the invention.
Figure 30D:
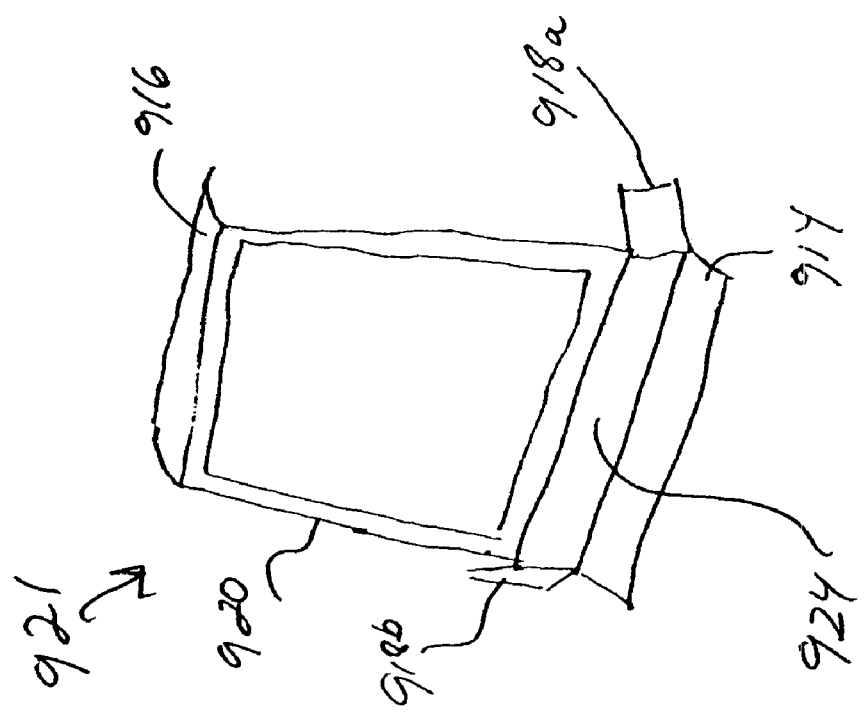
FIG. 30D is an illustrative perspective view of a rigid member, according to one embodiment of the invention.
Figure 30C:
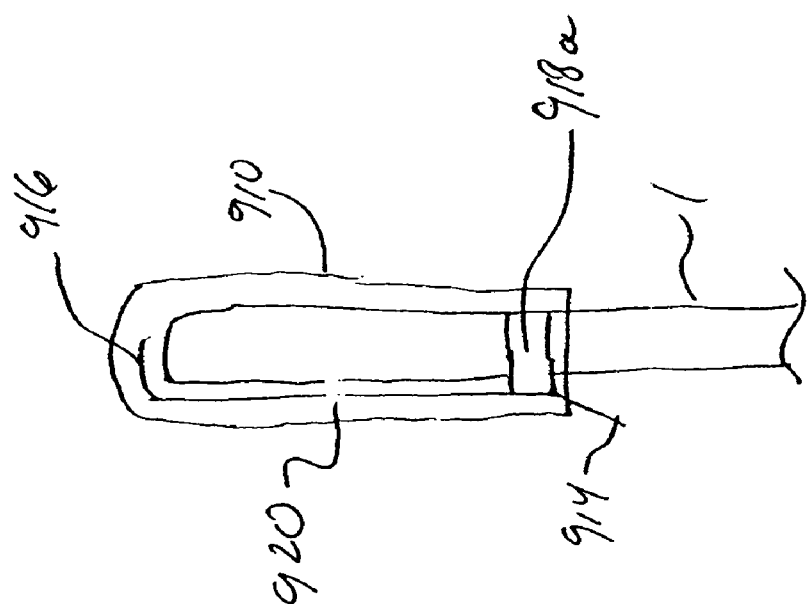
FIG. 30C is an illustrative side view of an aural device including an aural device sleeve and a rigid member in a closed position, according to one embodiment of the invention.

Referring to FIGS. 28A-28C, in still another embodiment, illustrative front views of an aural device (e.g. cell phone 1) including an aural device sleeve 706 and holder 710 are shown. In this embodiment, the device holder 710 is attached to the cell phone 1 via transparent sleeve 706. The transparent sleeve 706 is preferably made from a transparent elastic rubber material. The sleeve 706 is stretched over the top of the cell phone 1 and creates a friction fit with the cell phone 1. Alternatively, or additionally, an adhesive may be used to hold the sleeve 706 onto the cell phone handset 1. In one embodiment, the sleeve 706 includes holes (not shown) in the section covering the ear speaker so that sound from the speaker is not muffled by the sleeve 706, similar to the embodiment shown in FIG. 9. The embodiment shown in FIGS. 28A-28C allows the cell phone handset 1 to be used normally (i.e., without having the holder placed on the user's ear), with minimum interference.

In operation, the device holder 710 functions similar to the device holder 630 of FIGS. 24A and 24B. The device holder 710 when not in use is moved to a first position, as shown in FIG. 28C. When a user wishes to use the device holder 710 to hang the cell phone 1 from his/her ear, the user moves the device holder 710 to a second position (similar to position 633b of FIG. 24B). Once the device holder 710 is moved to the second position, the user need only hang the cell phone 1 from his/her ear.

Referring to FIGS. 29A-C, and 29E in another embodiment, illustrative side views of an aural device (e.g., cell phone 1) including an aural device sleeve 810 are shown. The sleeve 810 is preferably made from an elastic rubber material and defines cavity with an opening into the cavity. Disposed inside the sleeve 810 is a rigid member 821, which includes a lever portion 815, a curved portion 818, and a frame 820 (see FIG. 29D). The rigid member 821 also includes a tab portion 812 protruding from the opening of the sleeve 810.

The sleeve 810 is stretched over the top portion of the cell phone 1 and creates a friction fit with the top portion of the cell phone 1 disposed in the cavity. Alternatively, or additionally, an adhesive may be used to hold the hands-free sleeve 810 onto the top portion of the cell phone 1. Once the top portion cell phone 1 is inside the sleeve 810, the rigid member 821 rests against a front face of the cell phone 1 and the curved portion 818 rests on a top most portion of the cell phone 1.

In one embodiment, the sleeve 810 includes holes (not shown) in the section covering the ear speaker so that sound from the speaker is not muffled by the sleeve 810, similar to the embodiment shown in FIG. 9.

In operation, when a user wishes to attach the holder to his or her ear, the user presses the lever portion 814 (inside the sleeve 810) as shown by arrow 816. Pressing lever portion 814 causes the curved portion 818 to slide slightly back across the top most portion of the cell phone 1, as shown by arrow 822. This, in turn, causes the frame portion 820 to move away from the front face of the cell phone 1, as shown in FIGS. 29B and 29E. When the frame portion 820 moves away from the cell phone 1, the sleeve 810 is stretched away from the top portion of the cell phone thereby widening the opening to allow the top of the user's ear to be received into the cavity such that the holder and the cell phone are supported and retained on the user's ear when the holder is connected to the cell phone, thereby allowing hands-free use of the device.

Instead of curved portion 818 sliding, pressing the lever portion 814 may cause the lever portion 814 and the frame portion 820 to pivot to the position shown in FIGS. 29B and 29E. Although the frame portion 820 is shown as extending across the entire front face of the sleeve 810, the frame portion 820 may comprise a thin strip or rod extending lengthwise approximately centrally along the front face of the sleeve 810.

Referring to FIGS. 30A-C, and 30E in another embodiment, illustrative side views of an aural device (e.g., cell phone 1) including an aural device sleeve 910 are shown. The sleeve 910 is preferably made from an elastic rubber material and defines cavity with an opening into the cavity. Disposed inside the sleeve 910 is a rigid member 921, which includes a lever portions 918a, 918b, a curved portion 916, and a frame 920 (see FIG. 30D). The rigid member 921 also includes a tab portion 914 protruding from the opening of the sleeve 910.

The sleeve 910 is stretched over the top portion of the cell phone 1 and creates a friction fit with the top portion of the cell phone 1 disposed in the cavity. Alternatively, or additionally, an adhesive may be used to hold the hands-free sleeve 910 onto the top portion of the cell phone 1. Once the top portion cell phone 1 is inside the sleeve 910, the rigid member 921 rests against a front face of the cell phone 1 and the curved portion 916 rests on a top most portion of the cell phone 1.

In one embodiment, the sleeve 910 includes holes (not shown) in the section covering the ear speaker so that sound from the speaker is not muffled by the sleeve 910, similar to the embodiment shown in FIG. 9.

In operation, when a user wishes to attach the holder to his or her ear, the user presses the lever portions 918a, 918b located on opposite sides of the cell phone 1. In other words, the user simultaneously squeezes lever portion 918a, 918b towards each other with a thumb and index finger, for example. Pressing lever portions 918a, 918b causes a flexible portion 924 to bow out away from the front face of the cell phone 1 and the curved portion 916 to slide slightly back across the top most portion of the cell phone 1, as shown by arrow 926. When the flexible portion 924 bows out away from the cell phone 1, the sleeve 910 is stretched away from the top portion of the cell phone thereby widening the opening to allow the top of the user's ear to be received into the cavity such that the holder and the cell phone are supported and retained on the user's ear when the holder is connected to the cell phone, thereby allowing hands-free use of the device.

In a simplified embodiment of the device in FIGS. 30A-30E, the sleeve 910 may be made with only the flexible portion 924 and lever portions 918a, 918b embedded or otherwise arranged therein. In this simplified embodiment, the flexible portion bows outward and stretches the sleeve 910 to widen the opening.

Figure 31B:
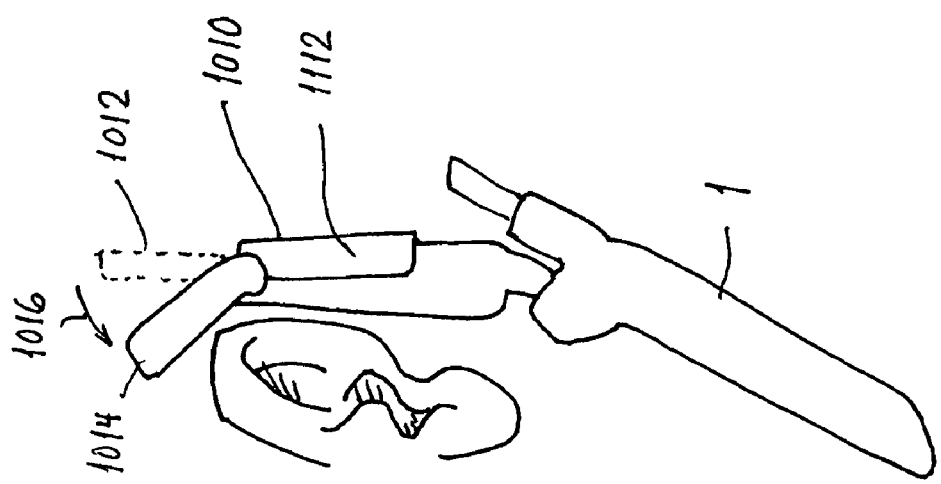
FIGS. 31A-31B are illustrative front and side views of an aural device including an aural device holder moveably coupled to the aural device, according to one embodiment of the invention.
Figure 31A:
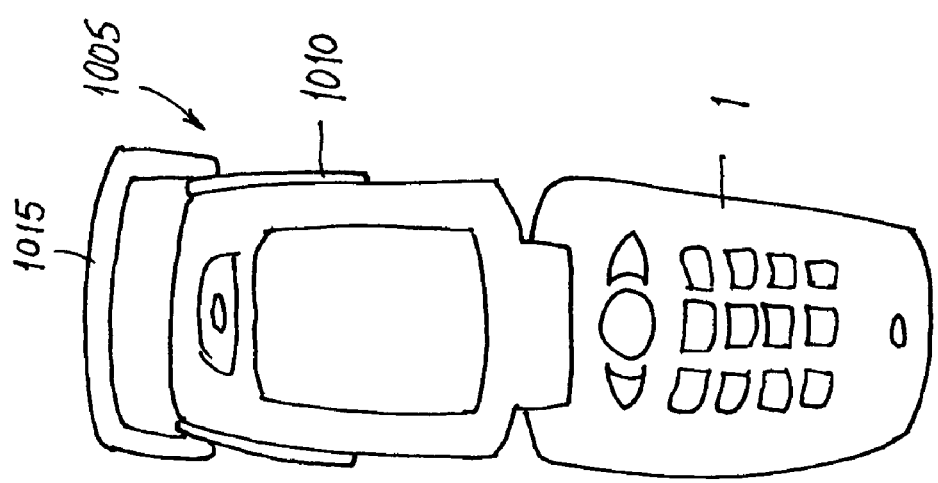
Figure 32:
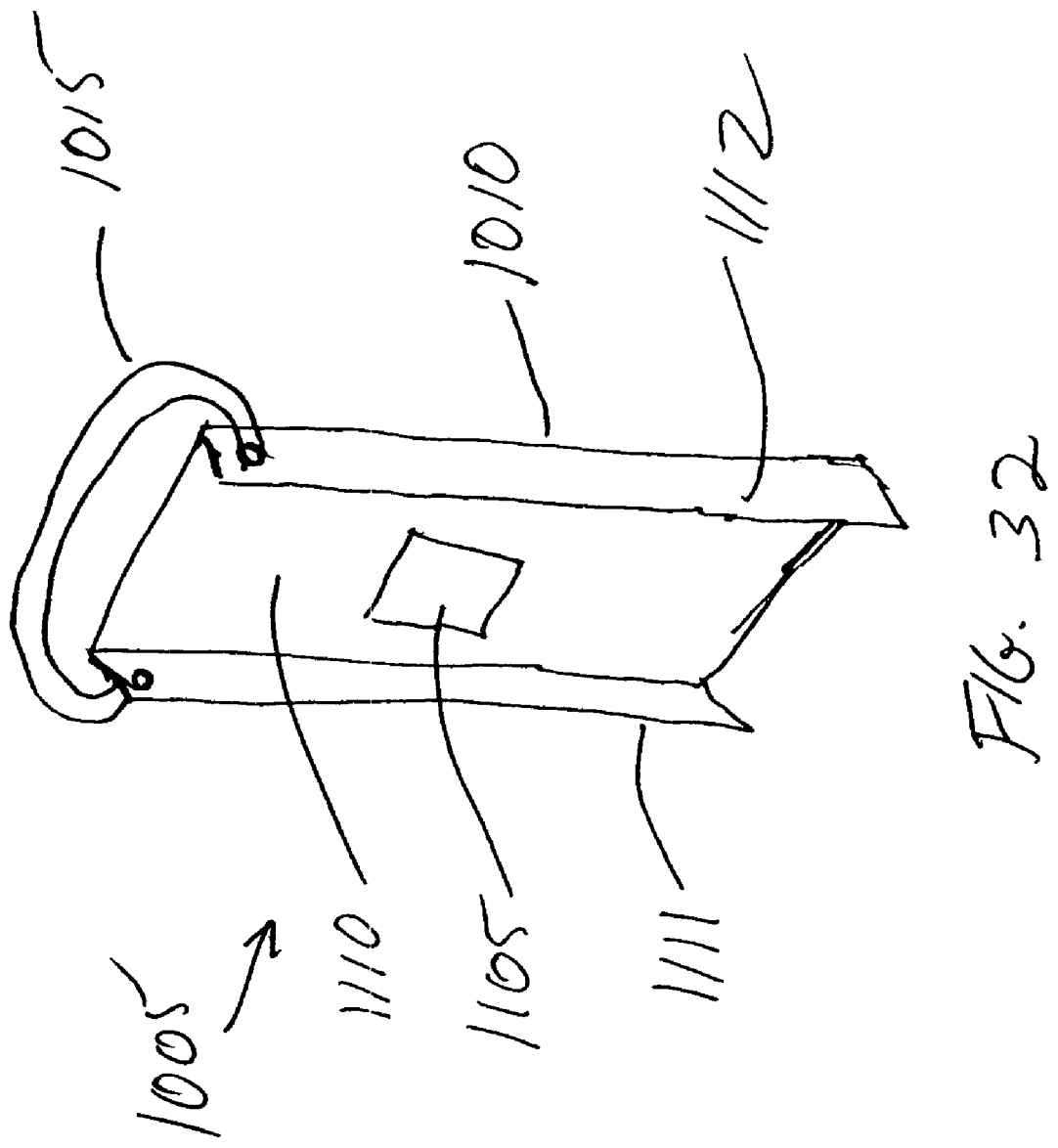
FIG. 32 is an illustrative perspective view of an aural device holder, according to one embodiment of the invention.

Referring to FIGS. 31A-B, in another embodiment, an illustrative front view of an aural device (e.g., a cell phone 1) including an aural device holder 1005 is shown. The device holder 1005 is shown alone in FIG. 32. In this embodiment, the device holder 1005 is attached to the cell phone 1 via a clip member 1010. The clip member 1010 is preferably made from a transparent flexible material that is rigid enough to retain its shape, and includes a back face 1110, two opposing side faces 1111, 1112, and an optional window 1105. The clip member 1010 is attached to an upper portion of the cell phone 1 by placing the back face of the upper portion of the cell phone in contact with the back face 1110 and having the opposing side faces 1111, 1112 grip respective opposing sides of the upper portion of the cell phone 1. In another embodiment, the side faces 1111, 1112 can include tabs that fit into a slot or groove on the side of the upper portion of the cell phone 1. Once the cell phone 1 is inserted into the clip member 1010, the clip member 1010 creates a friction fit with the cell phone 1.

The device holder 1005 further includes a curved member 1015 with opposing ends that are each rotatably coupled to the opposing side faces 1111, 1112 of the clip member 1010.

In operation, the device holder 1005 functions similar to the device holder 630 of FIGS. 24A and 24B. The curved member 1015 when not in use is moved to a first position 1012, as shown in FIG. 31B. When a user wishes to use the curved member 1015 to hang the cell phone 1 from his/her ear, the user moves the curved member 1015 to a second position 1014, as indicated by arrow 1016. Once the curved member 1015 is moved to the second position, the user need only hang the cell phone 1 from his/her ear.

In another embodiment, the curved member 1015 can be replaced by a sleeve member, such as the sleeve 650 shown in FIGS. 26A-C. In this embodiment, a portion of the sleeve is attached or affixed to the clip member 1010. As with some of the previously described embodiments, the sleeve is pulled over the top of the wearer's ear such that the holder and the cell phone are supported and retained on the user's ear when the holder is connected to the cell phone, thereby allowing hands-free use of the device.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hands-free holder for hands-free use of a device that is designed to be held up to a user's ear, the holder being connectable to the device and comprising:
   a sleeve comprising a transparent elastically stretchable material defining a cavity with an opening for receiving a top portion of the device into the cavity;
   a curved member comprising a first end and second end, the first end being rotatably coupled to a first side of the sleeve, the second end being rotatably coupled to an opposite side of the sleeve, the curved member defining an opening for receiving the top of a user's ear and being configured to rest on and behind the user's ear when the top of the user's ear is received in the opening such that the device and the connected holder are supported by the user's ear, thereby allowing hands-free use of the device.

2. The hands-free holder of claim 1, wherein the sleeve defines a second opening allowing the top portion of the device to extend out of the cavity such that the sleeve is wrapped around the top portion of the device.

3. The hands-free holder of claim 1, wherein the sleeve defines a plurality of holes disposed on a front face of the sleeve, the holes being positioned over a front face of the top portion of the device when the top portion of the device is disposed in the cavity.

4. The hands-free holder of claim 1, wherein the device is one of a telephone, cell phone, or PDA.

5. The hands-free holder of claim 1, wherein the holder is held onto the device by a friction fit when the top portion of the device is received into the cavity.

6. The hands-free holder of claim 5, wherein the holder further comprises an adhesive disposed on a wall of the cavity for connecting the holder to the device.

7. A hands-free holder for hands-free use of a device that is designed to be held up to a user's ear, the holder being connectable to the device and comprising:

a sleeve comprising an elastically stretchable material with an opening for receiving a top portion of the device, wherein a cavity is defined between the sleeve and a portion of the device designed to be held up to the user's ear when the device is received in the sleeve, a top of the user's ear being receivable in the cavity such that the sleeve and the device is supported and retained on the user's ear, thereby allowing hands-free use of the device; and a manually actuatable member arranged in or on the sleeve and actuatable to stretch the sleeve away from the portion of the device to be held up to the user's ear, thereby widening the opening to facilitate receipt of the top of the user's ear in the cavity.

8. The hands-free holder of claim 7, wherein the manually actuatable member comprises:

a rigid member comprising a frame portion and lever portion disposed inside the cavity, wherein the lever portion, when pressed moves the frame portion to stretch the sleeve away from the portion of the device to be held up to the user's ear when the top portion of the device is received in the sleeve.

9. The hands-free holder of claim 8, wherein the rigid member further comprises a projection extending out of the opening and projecting away from the device when the top portion of the device is disposed in the cavity to facilitate placement of the top of the user's ear into the sleeve.

10. The hands-free holder of claim 7, wherein said manually actuatable member comprises a flexible member actuable to bow outward.

11. The hands-free holder of claim 7, wherein the sleeve defines a plurality of holes disposed on a front face of the sleeve, the holes being positioned over a front face of the top portion of the device when the top portion of the device is received in the sleeve.

12. The hands-free holder of claim 7, wherein the elastically stretchable sleeve conforms to the contours of a user's ear when the top of the user's ear is inserted into the cavity.

13. The hands-free holder of claim 7, wherein the device is one of a telephone, cell phone, or PDA.

14. The hands-free holder of claim 7, wherein at least a portion of the front face of the sleeve is thinner than the remainder of the sleeve.

15. The hands-free holder of claim 7, wherein the sleeve is held onto the device by a friction fit when the top portion of the device is received in the sleeve.

16. The handset device of claim 15, wherein the handset device is one of a telephone, cell phone, or PDA.

17. The hands-free holder of claim 7, wherein the holder further comprises an adhesive disposed on a wall of the cavity for connecting the holder to the device.

18. A handset device designed to be held proximate a user's ear during use thereof having a device body and a holder arranged on the device body, wherein the holder comprises a curved member having a first end and second end, the first end being rotatably coupled to a first side of a top portion of the handset device, the second end being rotatably coupled to an opposite side of the top portion of the handset device, the curved member defining an opening for receiving the top of a user's ear and being configured to rest on and behind the user's ear when the top of the user's ear is received in the opening such that the device connected to the holder is supported by the user's ear, thereby allowing hands-free use of the device.

19. A hands-free holder for hands-free use of a device that is designed to be held up to a user's ear, the holder being connectable to the device and comprising:

a clip member comprising a rear wall and two opposing side walls adjacent to the rear wall, the two opposing side walls configured to grip two respective opposing sides of an upper portion of the device such that the rear wall contacts a rear face of the upper portion of the device and the upper portion of the device is held by the clip member;

a curved member comprising a first end and second end, the first end being rotatably coupled to one of the two opposing side walls, the second end being rotatably coupled to the other of the two opposing side walls, the curved member defining an opening for receiving the top of a user's ear and being configured to rest on and behind the user's ear when the top of the user's ear is received in the opening such that the device and the connected holder are supported by the user's ear, thereby allowing hands-free use of the device.

20. The hands-free holder of claim 19, wherein the device is one of a telephone, cell phone, or PDA.

21. The hands-free holder of claim 19, wherein the holder is held onto the device by a friction fit.

22. The hands-free holder of claim 19, wherein the clip member comprises a flexible material that is sufficiently rigid to retain its shape when the device and the holder are supported on the user's ear.

23. The hands-free holder of claim 19, wherein the opposing side walls comprise tabs, the tabs being inserted into a groove or slot in the device when the clip member is connected to the upper portion of the device.

* * * * *